US012031254B2

(12) United States Patent
Sivik et al.

(10) Patent No.: US 12,031,254 B2
(45) **Date of Patent: *Jul. 9, 2024**

(54) PROCESS OF REDUCING MALODORS ON FABRICS

(71) Applicant: The Procter & Gamble Company, Cincinnati, OH (US)

(72) Inventors: Mark Robert Sivik, Mason, OH (US); Sol Melissa Escobar, Mason, OH (US); Sarah Ann Delaney, Hebron, KY (US); Frank William Denome, Cincinnati, OH (US); Mark William Hamersky, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 298 days.

This patent is subject to a terminal disclaimer.

(21) Appl. No.: 16/823,656

(22) Filed: Mar. 19, 2020

(65) Prior Publication Data

US 2020/0299888 A1 Sep. 24, 2020

Related U.S. Application Data

(60) Provisional application No. 62/820,492, filed on Mar. 19, 2019.

(51) Int. Cl.

| | |
|---|---|
| ***C11D 3/20*** | (2006.01) |
| ***C11D 3/00*** | (2006.01) |
| ***C11D 3/04*** | (2006.01) |
| ***C11D 3/22*** | (2006.01) |
| ***C11D 3/24*** | (2006.01) |
| ***C11D 17/04*** | (2006.01) |
| ***C11D 17/08*** | (2006.01) |
| ***D06B 1/00*** | (2006.01) |
| ***D06L 1/00*** | (2017.01) |

(52) U.S. Cl.
CPC .............. *D06B 1/00* (2013.01); *C11D 3/0068* (2013.01); *C11D 3/042* (2013.01); *C11D 3/2086* (2013.01); *C11D 3/222* (2013.01); *C11D 17/043* (2013.01); *C11D 17/08* (2013.01); *D06L 1/00* (2013.01)

(58) Field of Classification Search
CPC ......... C11D 1/00; C11D 3/042; C11D 17/043; D06L 1/00
USPC ...................... 510/296, 439, 441, 477; 8/137
See application file for complete search history.

(56) References Cited

U.S. PATENT DOCUMENTS 3,293,718 A 12/1966 Thomas
3,859,125 A 1/1975 Miller et al.
(Continued)

FOREIGN PATENT DOCUMENTS

AU 2004/202461 B2 11/2007
CA 2695068 A1 9/2010
(Continued)

OTHER PUBLICATIONS

"Shelf life and storage conditions of citric acid, trisodium citrate and Citrocoat N",Feb. 2017, XP002799271.
(Continued)

*Primary Examiner* — Gregory R Delcotto
(74) *Attorney, Agent, or Firm* — Andrew J. Mueller; Andres Ernesto Velarde

(57) ABSTRACT

The present invention relates to a process for reducing malodors on fabrics using an acid delivery composition.

13 Claims, 4 Drawing Sheets

(56) References Cited

U.S. PATENT DOCUMENTS

| | | | | |
|---|---|---|---|---|
| 4,180,558 | A | 12/1979 | Goldberg et al. | |
| 4,286,016 | A | 8/1981 | Dimond et al. | |
| 4,287,219 | A | 9/1981 | Fabre | |
| 4,315,965 | A | 2/1982 | Mason et al. | |
| 4,342,813 | A | 8/1982 | Erickson | |
| 4,349,531 | A | 9/1982 | Mlodozeniec et al. | |
| 4,377,615 | A | 3/1983 | Suzuki et al. | |
| 4,397,391 | A | 8/1983 | Cornelissens | |
| 4,415,617 | A | 11/1983 | D'Elia | |
| 4,639,390 | A | 1/1987 | Shoji | |
| 4,892,758 | A | 1/1990 | Serbiak et al. | |
| 4,923,660 | A | 5/1990 | Willenberg et al. | |
| 5,041,252 | A | 8/1991 | Fujii et al. | |
| 5,110,678 | A | 5/1992 | Narukawa et al. | |
| 5,120,888 | A | 6/1992 | Nohr et al. | |
| 5,135,804 | A | 8/1992 | Harpell et al. | |
| 5,158,810 | A | 10/1992 | Oishi et al. | |
| 5,208,104 | A | 5/1993 | Ueda et al. | |
| 5,230,853 | A | 7/1993 | Colegrove et al. | |
| 5,246,603 | A | 9/1993 | Tsaur | |
| 5,342,335 | A | 8/1994 | Rhim | |
| 5,362,532 | A | 11/1994 | Famili et al. | |
| 5,364,627 | A | 11/1994 | Song | |
| 5,387,147 | A | 2/1995 | Ohshima et al. | |
| 5,429,874 | A | 7/1995 | Vanputte | |
| 5,455,114 | A | 10/1995 | Ohmory et al. | |
| 5,470,424 | A | 11/1995 | Isaac et al. | |
| 5,470,653 | A | 11/1995 | Honeycutt et al. | |
| 5,486,418 | A | 1/1996 | Ohmory et al. | |
| 5,518,730 | A | 5/1996 | Fuisz | |
| 5,520,924 | A | 5/1996 | Chapman et al. | |
| 5,538,735 | A | 7/1996 | Ahn | |
| 5,585,059 | A | 12/1996 | Kobayashi et al. | |
| 5,651,987 | A | 7/1997 | Fuisz | |
| 5,691,015 | A | 11/1997 | Tsukamoto et al. | |
| 5,705,183 | A | 1/1998 | Phillips et al. | |
| 5,716,692 | A | 2/1998 | Warner et al. | |
| 5,717,026 | A | 2/1998 | Ikimine et al. | |
| 5,735,812 | A | 4/1998 | Hardy | |
| 5,780,418 | A | 7/1998 | Niinaka et al. | |
| 5,827,586 | A | 10/1998 | Yamashita et al. | |
| 5,840,423 | A | 11/1998 | Sano et al. | |
| 5,863,887 | A | 1/1999 | Gillette | |
| 5,879,493 | A | 3/1999 | Johnson et al. | |
| 5,911,224 | A | 6/1999 | Berger | |
| 5,914,124 | A | 6/1999 | Mahoney et al. | |
| 5,942,179 | A | 8/1999 | Tallentire et al. | |
| 5,972,869 | A * | 10/1999 | Cao | C11D 3/0026 510/423 |
| 6,008,181 | A | 12/1999 | Cripe | |
| 6,037,319 | A | 3/2000 | Dickler et al. | |
| 6,066,396 | A | 5/2000 | Inada et al. | |
| 6,080,346 | A | 6/2000 | Jack | |
| 6,130,193 | A | 10/2000 | Gillette | |
| 6,175,054 | B1 | 1/2001 | Jacques | |
| 6,197,238 | B1 | 3/2001 | Wang et al. | |
| 6,207,274 | B1 | 3/2001 | Ferenc et al. | |
| 6,274,162 | B1 | 8/2001 | Steffenino et al. | |
| 6,319,510 | B1 | 11/2001 | Yates | |
| 6,406,797 | B1 | 6/2002 | Vanputte | |
| 6,420,625 | B1 | 7/2002 | Jones et al. | |
| 6,448,462 | B2 | 9/2002 | Groitzsch et al. | |
| 6,465,407 | B2 | 10/2002 | Hayashi et al. | |
| 6,552,123 | B1 | 4/2003 | Katayama et al. | |
| 6,576,575 | B2 | 6/2003 | Griesbach, III et al. | |
| 6,608,121 | B2 | 8/2003 | Isozaki et al. | |
| 6,657,004 | B2 | 12/2003 | Mizutani | |
| 6,699,826 | B1 | 3/2004 | Saijo et al. | |
| 6,727,215 | B2 | 4/2004 | Roberts | |
| 6,730,648 | B2 | 5/2004 | Gorlin et al. | |
| 6,783,852 | B2 | 8/2004 | Inada et al. | |
| 6,787,512 | B1 | 9/2004 | Verrall et al. | |
| 6,808,598 | B1 | 10/2004 | Takeuchi et al. | |
| 6,818,606 | B1 | 11/2004 | Hanada et al. | |
| 6,825,158 | B2 | 11/2004 | Mitra et al. | |
| 6,898,921 | B2 | 5/2005 | Duffield | |
| 6,949,498 | B2 | 9/2005 | Murphy et al. | |
| 6,956,070 | B2 | 10/2005 | Fujiwara et al. | |
| 6,977,116 | B2 | 12/2005 | Cabell et al. | |
| 7,026,049 | B2 | 4/2006 | Endo et al. | |
| 7,041,628 | B2 | 5/2006 | Sunder | |
| 7,067,575 | B2 | 6/2006 | Kitamura et al. | |
| 7,083,047 | B2 | 8/2006 | Bone et al. | |
| 7,094,744 | B1 | 8/2006 | Kobayashi et al. | |
| 7,115,551 | B2 | 10/2006 | Hasenorhrl et al. | |
| 7,169,740 | B2 | 1/2007 | Sommerville-Roberts et al. | |
| 7,196,026 | B2 | 3/2007 | Di Luccio et al. | |
| RE39,557 | E | 4/2007 | Moe | |
| 7,226,899 | B2 | 6/2007 | Cole et al. | |
| 7,285,520 | B2 | 10/2007 | Krzysik et al. | |
| 7,387,787 | B2 | 6/2008 | Fox | |
| 7,407,669 | B2 | 8/2008 | Leung et al. | |
| 7,429,273 | B2 | 9/2008 | DeDominicis et al. | |
| 7,445,643 | B2 | 11/2008 | Sadlowski | |
| 7,446,084 | B2 | 11/2008 | Barthel et al. | |
| 7,491,407 | B2 | 2/2009 | Pourdeyhimi et al. | |
| 7,507,698 | B2 | 3/2009 | Franzolin et al. | |
| 7,547,737 | B2 | 6/2009 | Kochvar et al. | |
| 7,563,757 | B2 * | 7/2009 | Kouvroukoglou | C11D 3/382 510/439 |
| 7,708,840 | B2 | 5/2010 | Wiedemann et al. | |
| 7,727,946 | B2 | 6/2010 | Catalfamo et al. | |
| 7,824,588 | B2 | 11/2010 | Yang et al. | |
| 7,856,989 | B2 | 12/2010 | Karles et al. | |
| 7,967,801 | B2 | 6/2011 | Hammons et al. | |
| 8,338,358 | B2 | 12/2012 | Bernhardt | |
| 8,349,232 | B2 | 1/2013 | Pourdeyhimi et al. | |
| 8,785,361 | B2 | 7/2014 | Sivik | |
| 9,068,151 | B2 | 6/2015 | Gerke et al. | |
| 9,074,305 | B2 | 7/2015 | Glenn, Jr. | |
| 9,163,205 | B2 * | 10/2015 | Sivik | B29C 43/006 |
| 9,175,250 | B2 | 11/2015 | Sivik | |
| 9,259,132 | B2 | 2/2016 | Sumnicht et al. | |
| 9,267,095 | B2 * | 2/2016 | Delaney | C11D 1/825 |
| 9,421,153 | B2 | 8/2016 | Sivik | |
| 9,480,628 | B2 * | 11/2016 | Sivik | A61Q 5/12 |
| 9,493,726 | B2 | 11/2016 | Vinson | |
| 9,506,022 | B2 | 11/2016 | Ronco et al. | |
| 9,796,948 | B2 | 10/2017 | Shearouse | |
| 10,045,915 | B2 | 8/2018 | Glenn, Jr. | |
| 2001/0037851 | A1 | 11/2001 | Mortellite et al. | |
| 2002/0013251 | A1 | 1/2002 | Hayashi | |
| 2002/0018906 | A1 | 2/2002 | Clark | |
| 2002/0098994 | A1 | 7/2002 | Zafar | |
| 2002/0161088 | A1 | 10/2002 | Kochvar et al. | |
| 2002/0173213 | A1 | 11/2002 | Chu et al. | |
| 2003/0017208 | A1 | 1/2003 | Ignatious et al. | |
| 2003/0045446 | A1 | 3/2003 | Dihora et al. | |
| 2003/0166495 | A1 | 9/2003 | Wang et al. | |
| 2003/0185872 | A1 | 10/2003 | Kochinke | |
| 2003/0216098 | A1 | 11/2003 | Carlyle | |
| 2003/0224959 | A1 | 12/2003 | Smith | |
| 2004/0129032 | A1 | 7/2004 | Severns | |
| 2004/0167256 | A1 | 8/2004 | Verrall et al. | |
| 2004/0170836 | A1 | 9/2004 | Bond et al. | |
| 2004/0180597 | A1 | 9/2004 | Kamada et al. | |
| 2004/0204543 | A1 | 10/2004 | Yang | |
| 2004/0253434 | A1 * | 12/2004 | Patel | C11D 3/37 428/324 |
| 2005/0003048 | A1 | 1/2005 | Pearce et al. | |
| 2005/0003980 | A1 | 1/2005 | Baker | |
| 2005/0003991 | A1 | 1/2005 | MacQuarrie | |
| 2005/0008776 | A1 | 1/2005 | Chhabra et al. | |
| 2005/0010010 | A1 | 1/2005 | Kitamura et al. | |
| 2005/0124521 | A1 | 6/2005 | Sadlowski | |
| 2005/0136112 | A1 | 6/2005 | Gonzales et al. | |
| 2005/0136780 | A1 | 6/2005 | Clark et al. | |
| 2005/0186256 | A1 | 8/2005 | Dihel et al. | |
| 2005/0209574 | A1 | 9/2005 | Boehringer et al. | |
| 2005/0281757 | A1 | 12/2005 | Ibrahim et al. | |
| 2006/0013869 | A1 | 1/2006 | Ignatious et al. | |
| 2006/0035042 | A1 | 2/2006 | Morken | |
| 2006/0083784 | A1 | 4/2006 | Ignatious et al. | |

(56) References Cited

U.S. PATENT DOCUMENTS

2006/0111261 A1* 5/2006 Sadlowski ........... C11D 17/003 510/221
2006/0122088 A1 6/2006 Sadlowski
2006/0127458 A1 6/2006 Kiser et al.
2006/0134412 A1 6/2006 Mackey et al.
2006/0160453 A1 7/2006 Suh
2006/0189772 A1 8/2006 Scheibel et al.
2006/0205628 A1 9/2006 Deinhammer
2006/0254013 A1 11/2006 Konishi et al.
2006/0254014 A1 11/2006 Konishi et al.
2006/0258251 A1 11/2006 Konishi et al.
2006/0264130 A1 11/2006 Karles et al.
2007/0048839 A1 3/2007 Breves et al.
2007/0054579 A1 3/2007 Baker et al.
2007/0110792 A9 5/2007 Simon
2007/0128256 A1 6/2007 Aubrun-Sonneville
2007/0134304 A1 6/2007 Aubrun-Sonneville et al.
2007/0134481 A1 6/2007 Aubrun-Sonneville
2007/0253926 A1 11/2007 Tadrowski et al.
2007/0259170 A1 11/2007 Brown et al.
2007/0259996 A1 11/2007 Vicari et al.
2007/0298064 A1 12/2007 Koslow
2008/0035174 A1 2/2008 Aubrun-Sonneville et al.
2008/0045431 A1 2/2008 Corradini
2008/0108748 A1 5/2008 Buckley et al.
2008/0118727 A1 5/2008 Andersen
2008/0146481 A1 6/2008 Brown et al.
2008/0149119 A1 6/2008 Marquez et al.
2008/0220054 A1 9/2008 Shastri et al.
2008/0226919 A1 9/2008 Hosoda et al.
2008/0242572 A1 10/2008 Icht et al.
2008/0269095 A1 10/2008 Aubrun-Sonneville
2009/0004254 A1 1/2009 Maibach
2009/0041820 A1 2/2009 Wu et al.
2009/0061496 A1 3/2009 Kuhn et al.
2009/0061719 A1 3/2009 Shibutani et al.
2009/0155326 A1 6/2009 Mack et al.
2009/0181587 A1 7/2009 Kang et al.
2009/0249558 A1 10/2009 Fileccia et al.
2009/0285718 A1 11/2009 Privitera et al.
2009/0291282 A1 11/2009 Kitamura et al.
2010/0018641 A1 1/2010 Branham et al.
2010/0021517 A1 1/2010 Ahlers et al.
2010/0105821 A1 4/2010 Verrall et al.
2010/0166854 A1 7/2010 Michniak-Kohn et al.
2010/0196440 A1 8/2010 Stark et al.
2010/0266668 A1 10/2010 Coffee et al.
2010/0279905 A1 11/2010 Glenn, Jr. et al.
2010/0285101 A1 11/2010 Moore et al.
2011/0136719 A1 6/2011 Jalbert et al.
2011/0159267 A1 6/2011 Lee et al.
2011/0223381 A1 9/2011 Mackey et al.
2011/0230112 A1 9/2011 Rosé et al.
2011/0301070 A1 12/2011 Ochomogo et al.
2012/0021026 A1 1/2012 Glenn, Jr. et al.
2012/0027838 A1 2/2012 Gordon et al.
2012/0048769 A1 3/2012 Sivik et al.
2012/0052036 A1 3/2012 Glen, Jr. et al.
2012/0053103 A1 3/2012 Sivik et al.
2012/0053108 A1 3/2012 Glen, Jr. et al.
2012/0058166 A1 3/2012 Glen, Jr. et al.
2012/0066855 A1 3/2012 Schmidt et al.
2012/0082037 A1 3/2012 Sivik et al.
2012/0154300 A1 6/2012 Ma
2012/0172831 A1 7/2012 Darcy et al.
2012/0215148 A1 8/2012 Ewert et al.
2012/0237576 A1 9/2012 Gordon et al.
2013/0171421 A1 7/2013 Weisman et al.
2013/0172226 A1* 7/2013 Dreher .................. D06M 23/12 510/439
2014/0287973 A1 9/2014 Sivik et al.
2014/0366294 A1 12/2014 Roe
2015/0048001 A1 2/2015 Bailey
2015/0071572 A1 3/2015 Dreher
2015/0104856 A1 4/2015 Astrid
2015/0158645 A1* 6/2015 Meier .................. C11D 17/042 53/410
2015/0159330 A1 6/2015 Weisman et al.
2015/0252304 A1 9/2015 Souter et al.
2015/0267155 A1* 9/2015 Brooker ............... C11D 17/043 8/137
2015/0313807 A1 11/2015 Lynch
2015/0329807 A1 11/2015 Naqvi
2016/0010041 A1 1/2016 Sivik
2016/0040105 A1 2/2016 Depoot et al.
2016/0101026 A1 4/2016 Pratt et al.
2016/0101204 A1 4/2016 Lynch
2016/0186095 A1 6/2016 Vockenroth
2016/0200501 A1 7/2016 Lee
2016/0271021 A1 9/2016 Glenn, Jr.
2016/0340624 A1 11/2016 Sivik
2016/0374906 A1 12/2016 Sivik
2017/0009191 A1 1/2017 Maes
2017/0067002 A1 3/2017 Cumming
2017/0164612 A1 6/2017 Ripberger
2017/0320105 A1 11/2017 Roozrokh
2017/0321152 A1 11/2017 Meine
2017/0355938 A1 12/2017 Lee
2017/0368580 A1 12/2017 Brandt Sanz et al.
2018/0002084 A1 1/2018 Keuleers et al.
2018/0118906 A1 5/2018 Lee et al.
2018/0216050 A1 8/2018 Denome
2018/0216052 A1 8/2018 Denome
2018/0216053 A1 8/2018 Denome
2018/0223229 A1 8/2018 Tan
2018/0338890 A1 11/2018 Glenn, Jr.
2020/0140791 A1 5/2020 Delaney
2020/0297645 A1 9/2020 Sivik et al.
2020/0299622 A1* 9/2020 Sivik ...................... C11D 3/222
2020/0299623 A1 9/2020 Sivik et al.

FOREIGN PATENT DOCUMENTS

CN 1678728 A 10/2005
CN 101056970 A 10/2007
CN 103282015 A 9/2013
CN 104040061 A 9/2014
CN 105518119 A 4/2016
CN 107574053 A 1/2018
CN 107849499 A 3/2018
DE 10 2007 011606 A1 9/2008
EP 0376893 A2 7/1990
EP 0299532 B1 9/1992
EP 1 275 368 A1 1/2003
EP 1 306 425 A2 5/2003
EP 1 409 628 B1 2/2006
EP 1 512 701 B1 6/2006
EP 1 887 036 A2 2/2008
EP 1 888 036 2/2008
EP 1 436 376 B1 4/2010
EP 2 226 379 A1 9/2010
EP 1 948 771 B1 12/2010
EP 2 319 965 A1 5/2011
EP 2 363 432 A1 9/2011
EP 2 363 517 A1 9/2011
EP 2 395 142 A1 12/2011
EP 3409754 A1 * 12/2018
EP 3650523 A1 5/2020
GB 2107579 A 5/1993
GB 2375542 11/2002
GB 2449418 11/2008
HU 221299 B1 9/2002
JP 62-156348 7/1987
JP 3040879 A 2/1991
JP 3101618 A 4/1991
JP 09279457 10/1997
JP 10008364 1/1998
JP 10158700 A 6/1998
JP H10204499 A 8/1998
JP 2000169896 A 6/2000
JP 2001120650 A 5/2001
JP 2007514466 A 6/2007
JP 2009079329 4/2009
JP 2017517611 A 6/2017

(56) References Cited

FOREIGN PATENT DOCUMENTS

| | | | |
|---|---|---|---|
| JP | 2017526826 | A | 9/2017 |
| JP | 2017531098 | A | 10/2017 |
| JP | 2018509531 | A | 4/2018 |
| KR | 20150100464 | A | 9/2015 |
| WO | WO 1992/006603 | A1 | 4/1992 |
| WO | WO 1994/002377 | A1 | 2/1994 |
| WO | WO 94/04656 | A2 | 3/1994 |
| WO | WO 95/23888 | A1 | 9/1995 |
| WO | WO 99/57155 | | 11/1999 |
| WO | WO 2000/013680 | A2 | 3/2000 |
| WO | 0027958 | A1 | 5/2000 |
| WO | WO 01/25322 | A1 | 4/2001 |
| WO | WO 2001/54667 | A1 | 8/2001 |
| WO | 0208380 | A1 | 1/2002 |
| WO | WO 03/060007 | A1 | 7/2003 |
| WO | WO 2004/009335 | A1 | 1/2004 |
| WO | WO 2004/081162 | A1 | 9/2004 |
| WO | 2005061685 | A1 | 7/2005 |
| WO | WO 2005/068604 | A1 | 7/2005 |
| WO | 2006005919 | A1 | 1/2006 |
| WO | 2006059811 | A1 | 6/2006 |
| WO | WO 2006/106514 | A2 | 10/2006 |
| WO | WO 2007/089259 | A1 | 8/2007 |
| WO | WO 2007/093558 | A3 | 1/2008 |
| WO | WO 2009/022761 | A1 | 2/2009 |
| WO | 2009047124 | | 4/2009 |
| WO | WO 2007/014221 | A3 | 4/2009 |
| WO | WO 2009/103576 | A1 | 8/2009 |
| WO | 2009121682 | A1 | 10/2009 |
| WO | WO 2009/121900 | A1 | 10/2009 |
| WO | WO 2010/015709 | A2 | 2/2010 |
| WO | WO 2011/153023 | A1 | 12/2011 |
| WO | 2012003367 | A3 | 3/2012 |
| WO | 2016119933 | A1 | 8/2016 |
| WO | 2017096354 | A1 | 6/2017 |
| WO | 2018140431 | A1 | 8/2018 |
| WO | 2018140454 | A1 | 8/2018 |
| WO | 2018140472 | A1 | 8/2018 |
| WO | 2018140668 | A1 | 8/2018 |
| WO | 2018140675 | A1 | 8/2018 |
| WO | 2018140676 | A2 | 8/2018 |
| WO | 2018231885 | A1 | 12/2018 |

OTHER PUBLICATIONS

All Office Actions, U.S. Appl. No. 16/823,375.
All Office Actions; U.S. Appl. No. 16/823,645.
"(E)-hept-2-enal: trans-2-heptenal", pp. 1/54-7/54, XP002799267, Retrieved from the Internet: URL:http://www.thegoodscentscompany.com/data/rw1028241.html [retrieved on Jun. 4, 2020]The Good Scents Company.
PCT Search Report for appl. No. PCT/US2018/015354, dated May 14, 2018, 13 pages.
PCT Search Report for appl. No. PCT/CN2017/087707, dated Feb. 24, 2018, 12 pages.
PCT Search Report for appl. No. PCT/US2017/046391, dated Nov. 8, 2017, 17 pages.
PCT Search Report for appl. No. PCT/US2018/015357, dated Apr. 11, 2018, 14 pages.
PCT Search Report for appl. No. PCT/US2018/015358, dated Apr. 16, 2018, 15 pages.
PCT Search Report for app. No. PCT/US2019/014452, dated Apr. 8, 2019, 14 pages.
PCT Search Report for appl. no. PCT/U52019/014453, dated Apr. 8, 2019, 15 pages.
PCT Search Report for appl. No. PCT/U52019/014454, dated Apr. 5, 2019, 15 pages.
PCT Search Report for appl. No. PCT/US2019/014455, dated Apr. 5, 2019, 15 pages.
PCT Search Report for appl. No. PCT/US2019/014443, dated Apr. 17, 2019, 15 pages.
PCT Search Report for appl. No. PCT/US2019/014444, dated Apr. 16, 2019, 15 pages.
PCT Search report for appl. No. PCT/U52019/014451, dated Apr. 24, 2019, 12 pages.
PCT Search Report for appl. No. PCT/US2019/019547, dated May 22, 2019, 12 pages.
PCT Search Report for appl. No. PCT/US2019/049727, dated Jan. 2, 2020, 12 pages.
PCT Search report for appl. No. PCT/US2019/040240, dated Dec. 9, 2019, 15 pages.
PCT Search Report for appl. No. PCT/US19/40242, dated Oct. 22, 2019, 14 pages.
PCT Search Report for appl. No. PCT/US2019/052321, 12 pages, dated Dec. 12, 2019.
PCT Search Report for App. No. PCT/USS2019/060216, dated Apr. 3, 2020, 14 pages.
PCT Search Report for App. No. PCT/US2020/015189, dated May 7, 2020. 15 pgs.
EP Search Report for appl. No. 19163586.1-1105, dated Sep. 30, 2019, 8 pages.
PCT Search Report for appl. No. PCT/US2020/022904, dated Jun. 8, 2020, 14 pages.
PCT Search Report for appl. No. PCT/US2020/022952, dated Jun. 8, 2020, 13 pages.
Search Report for appl. No. 19163588.7-1105, dated Sep. 30, 2019, 7 pages.
PCT Search Report for appl. No. PCT/US2020/023562, dated Jun. 23, 2020, 15 pages.
PCT Search Report for appl. No. PCT/US2020/023568, dated Jun. 23, 2020, 18 pages.
Jun. 6, 2020 (Jun. 6, 2020), "6-Methyl-5-hepten-2-one",XP002799268, retrieved from NCBIDatabase accession No. CID:9862.
AA1109 PCT Search Report for appl. No. PCT/CN2017/072926, dated Feb. 6, 2017, 5 pages.
AA1110 PCT Search Report for appl. No. PCT/CN2017/072927, dated Feb. 6, 2017, 6 pages.
AA1111 PCT Search Report for appl. No. PCT/CN2017/072935, dated Jun. 9, 2017, 4 pages.
AA1258M—PCT appl. no. PCT/CN2018/074281, dated Aug. 29, 2019, 7 pages.
AA1262 PCT Search Report for appl. No. PCT/ CN2018/ 074282, dated Oct. 22, 2018, 5 pages.
Jungbunzlauer2012, XP002799269, Retrieved from the Internet: URL:https://www.jungbunzlauer.com/fileadmin/content/PDF/PRINT PROJECTS/Folder/JBL F0 Functional Acids 2012 VI.pdf—[retrieved on Jun. 5, 2020].
Makadia, et al., "Poly Lactic-co-Glycolic Acid (PLGA) as Biodegradable Controlled Drug Delivery Carrier", Polymers, 3, pp. 1377-1397 (2011).
Smith, et al., "Nanofibrous Scaffolds and Their Biological Effects", Nantechnologies for the Life Sciences, vol. 9, pp. 188-215 (2006).
Specialities functional acids, jungbunzlauerRetrieved from the Internet: URL:https://www.jungbunzlauer.com/fileadmin/content/ PDF/PRINT PROJECTS/Folder/JBL F0 Func2012, XP002799269, [retrieved on Jub. 12, 2020] the whole document.
Wang, et al., "A Novel Controlled Release Drug Delivery System for Multiple Drugs Based on Electrospun Nanofibers Containing Nanoparticles", Journal of Pharmaceutical Sciences, vol. 99, No. 12 (Dec. 2010).
All Office Actions; U.S. Appl. No. 16/823,378.

* cited by examiner

PROCESS OF REDUCING MALODORS ON FABRICS

FIELD OF THE INVENTION

The present invention relates to a process for reducing malodors on fabrics using a detergent composition in combination with an acid delivery system.

BACKGROUND OF THE INVENTION

Laundry wash processes are designed to eliminate soils from fabrics. Some soils can cause malodors on fabrics and in some instances these malodors can persist even after the laundry wash operation.

Therefore, there is an on-going need for processes to reduce malodors on fabrics.

It was surprisingly found that the process according to the present invention provided reduced malodors on fabrics.

Without wishing to be bound by theory, it is believed that it is the combination of the addition of a concentrated acid delivery system with the detergent during that wash cycle that provides the reduced malodor benefit on the fabrics through the wash.

SUMMARY OF THE INVENTION

A first aspect of the present invention is a process of reducing malodors on fabrics, comprising the steps of;

a. combining fabrics with a wash liquor, wherein the fabrics comprise at least one source of malodor and wherein the wash liquor comprises a detergent and a concentrated acid delivery source;
b. washing the fabrics in the wash liquor using an automatic wash operation, a manual wash operation of a mixture thereof, preferably an automatic wash operation; and
c. separating the fabrics and the wash liquor from one another.

A second aspect of the present invention is the use of a process to reduce malodor on fabrics in a wash liquor, comprising the steps of:

a. Combining fabrics with a wash liquor, wherein the fabrics comprise at least one source of malodor and wherein the wash liquor comprises a detergent having a pH of less than 6 and a concentrated acid delivery source;
b. Washing the fabrics in the wash liquor using an automatic wash operation, a manual wash operation of a mixture thereof, preferably an automatic wash operation; and
c. Separating the fabrics and the wash liquor from one another.

DETAILED DESCRIPTION OF THE INVENTION

Process

Figure 1:
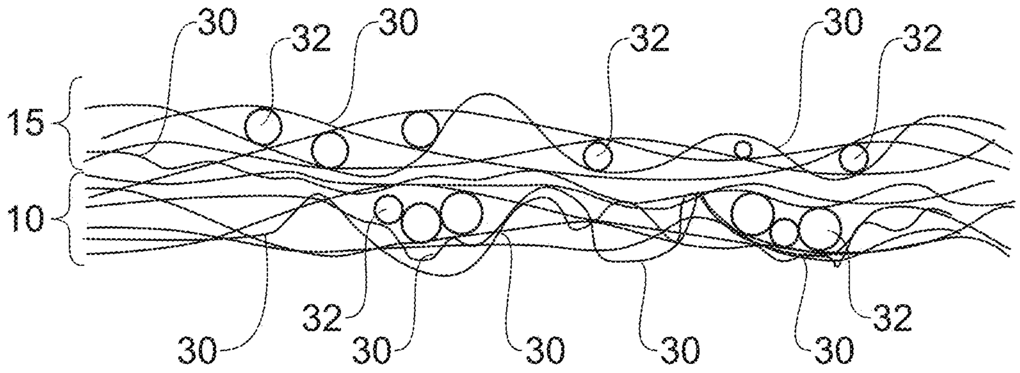
FIG. 1 is a schematic representation of a cross-sectional view of an example of a multi-ply fibrous structure.

The present invention is to a process of reducing malodors on fabrics.

A ‘malodor’ in the context of the present invention is an undesired or undesirable smell on the fabrics. Those skilled in the art will be aware of what an undesirable smell is as compared to a desirable smell.

The process comprises the steps of combining fabrics with a wash liquor, wherein the fabrics comprise at least one source of malodor and wherein the wash liquor is prepared by diluting a laundry detergent composition and a water-soluble fibrous unit dose in water by a factor of between 100 and 3000 fold, preferably between 300 and 900 fold. The fabric may be any suitable fabric. By fabric we preferably mean a textile or cloth comprising a network of natural or synthetic fibers. Those skilled in the art will be aware of suitable fabrics. The fabric may be selected from cotton, polyester, cotton/polyester blends, polyamide, lycra, rayon, or a mixture thereof.

The fabric comprises at least one source of malodor. Those skilled in the art will be aware of suitable sources of malodor. Sources of malodor could include the products of chemical breakdown of body soils. The source of malodor may comprise 6-Methyl-5-heptane-2-one, Trans-2-heptanal, 3-methyl-2-Butenal or a mixture thereof.

Those skilled in the art will know how to make the wash liquor. Without wishing to be bound by theory, addition of the laundry detergent composition to water will cause the laundry detergent composition to dissolve and create the wash liquor.

The wash liquor can be created automatically in the drum of an automatic washing machine or can be made in a manual wash operation.

The laundry detergent composition may be comprised in a water-soluble unit dose article, wherein the water-soluble unit dose article comprises a water-soluble film. The laundry detergent composition may be a liquid detergent or a powder detergent. The laundry detergent composition may be a fibrous detergent or in the form of sheets. The detergent will combine with the water creating the main wash liquor. The wash liquor can be created automatically in the drum of an automatic washing machine or can be made in a manual wash operation. When made in the drum of an automatic washing machine, traditionally, the fabrics to be washed and the water-soluble unit dose article are added to the drum and the door of the washing machine closed. The washing machine then automatically adds water to the drum to create the wash liquor.

Preferably the wash liquor comprises between 1 L and 64 L, preferably between 2 L and 32 L, more preferably between 3 L and 20 L of water.

The laundry detergent composition is described in more detail below.

The process further comprises washing the fabrics in the wash liquor using an automatic wash operation, a manual wash operation of a mixture thereof, preferably an automatic wash operation.

Those skilled in the art will know how to wash fabrics in an automatic wash operation, a manual wash operation or a mixture thereof.

Preferably, the wash liquor is at a temperature of between 5° C. and 90° C., preferably between 10° C. and 60° C., more preferably between 12° C. and 45° C., most preferably between 15° C. and 40° C.

Preferably, washing the fabrics in the wash liquor takes between 5 minutes and 50 minutes, preferably between 5 minutes and 40 minutes, more preferably between 5 minutes and 30 minutes, even more preferably between 5 minutes and 20 minutes, most preferably between 6 minutes and 18 minutes to complete.

Preferably, the wash liquor comprises between 1 kg and 20 kg, preferably between 3 kg and 15 kg, most preferably between 5 and 10 kg of the fabrics.

The wash liquor may comprise water of any hardness preferably varying between 0 gpg to 40 gpg. A lower water hardness is termed soft water whereas a higher water hardness is termed hard water.

The process further comprises separating the fabrics and the wash liquor from one another.

The fabrics and the wash liquor are separated from one another following washing of the fabrics. Such separation may involve removing the fabrics from the wash liquor, or draining the wash liquor away from the fabrics. In an automatic washing machine operation it is preferred that the wash liquor is draining away from the fabrics. In the avoidance of doubt, some of the wash liquor may remain soaked into the fabrics following separation of the fabrics and the main wash liquor, i.e. the fabrics remain wet. With respect to the present invention the fabrics and wash liquor are deemed separated from one another once the fabric is separate from the main volume of the wash liquor or the mina volume of the wash liquor has been drained away, despite some residual wash liquor possibly remaining soaked into the fabrics.

The process further comprises drying the fabrics.

Those skilled in the art will be aware of suitable means to dry the fabrics. The fabrics may be dried on a line at room temperature, in an automatic drying machine or a mixture thereof. Those skilled in the art will know at what point the fabrics are deemed dry as opposed to wet.

Laundry Detergent Composition

The process according to the present invention comprises the step of diluting a laundry detergent composition. The laundry detergent composition may have a pH greater than 6 or less than 6.

The laundry detergent composition having a pH greater than 6 may be a powder, a liquid, a water-soluble unit dose article or a mixture thereof, preferably a water-soluble unit dose comprising a liquid composition.

The solid laundry detergent composition may comprise solid particulates or may be a single homogenous solid. Preferably, the solid laundry detergent composition comprises particles. This means the solid laundry detergent composition comprises individual solid particles as opposed to the solid being a single homogenous solid. The particles may be free-flowing or may be compacted, preferably free-flowing.

The term 'liquid laundry detergent composition' refers to any laundry detergent composition comprising a liquid capable of wetting and treating a fabric, and includes, but is not limited to, liquids, gels, pastes, dispersions and the like. The liquid composition can include solids or gases in suitably subdivided form, but the liquid composition excludes forms which are non-fluid overall, such as powders, tablets or granules.

The water-soluble unit dose article is described in more detail below.

The laundry detergent composition comprises between 0.01% to 5%, more preferably from 0.03% to 1%, most preferably from 0.05% to 0.5% by weight of the laundry detergent composition of an oligoamine or salt thereof. The oligoamine or salt thereof is described in more detail below.

The laundry detergent composition preferably comprises a non-soap surfactant. More preferably, the non-soap surfactant is selected from non-soap anionic surfactant, non-ionic surfactant, amphoteric surfactant, cationic surfactant, or a mixture thereof. The laundry detergent composition preferably comprises between 10% and 60%, more preferably between 20% and 55% by weight of the laundry detergent composition of the non-soap surfactant.

Preferably, the non-soap anionic surfactant comprises linear alkylbenzene sulphonate, alkoxylated alkyl sulphate, alkyl sulfate, or a mixture thereof. Preferably, the alkyl sulphate is an ethoxylated alkyl sulphate.

Preferably, the laundry detergent composition comprises between 5% and 50%, preferably between 15% and 45%, more preferably between 25% and 40%, most preferably between 30% and 40% by weight of the detergent composition of the non-soap anionic surfactant.

Preferably, the non-soap anionic surfactant comprises linear alkylbenzene sulphonate and alkoxylated alkyl sulphate, wherein the ratio of linear alkylbenzene sulphonate to alkoxylated alkyl sulphate preferably the weight ratio of linear alkylbenzene sulphonate to ethoxylated alkyl sulphate is from 1:2 to 20:1, preferably from 1.1:1 to 15:1, more preferably from 1.2:1 to 10:1, even more preferably from 1.3:1 to 5:1, most preferably from 1.4:1 to 3:1.

Preferably, the laundry detergent composition comprises between 0% and 10%, preferably between 0.01% and 8%, more preferably between 0.1% and 6%, most preferably between 0.15% and 4% by weight of the laundry detergent composition of a non-ionic surfactant. The non-ionic surfactant is preferably selected from alcohol alkoxylate, an oxo-synthesized alcohol alkoxylate, Guerbet alcohol alkoxylates, alkyl phenol alcohol alkoxylates or a mixture thereof.

Preferably, the laundry preferably liquid laundry detergent composition comprises between 1.5% and 20%, more preferably between 2% and 15%, even more preferably between 3% and 10%, most preferably between 4% and 8% by weight of the laundry detergent composition of soap, preferably a fatty acid salt, more preferably an amine neutralized fatty acid salt, wherein preferably the amine is an alkanolamine more preferably selected from monoethanolamine, diethanolamine, triethanolamine or a mixture thereof, more preferably monoethanolamine.

The laundry detergent composition may comprise an ingredient selected from the list comprising cationic polymers, polyester terephthalates, amphiphilic graft co-polymers, carboxymethylcellulose, enzymes, perfumes, encapsulated perfumes, bleach or a mixture thereof. Without wishing to be bound by theory it is believed further addition of these materials can further facilitate malodor reduction.

The laundry detergent composition may comprise an adjunct ingredient, wherein the adjunct ingredient is selected from non-aqueous solvents, water, hueing dyes, aesthetic dyes, enzymes, cleaning polymers, builders like fatty acid, bleach, dispersants, dye transfer inhibitor polymers, fluorescent whitening agent, opacifier, antifoam or a mixture thereof.

Preferably, the laundry detergent composition comprises a chelant, wherein the chelant is preferably selected from phosphonates, aminocarboxylates, amino phosphonates, polyfunctionally-substituted aromatic chelating agents, or mixtures thereof, more preferably an additional chelating agent selected from DTPA (diethylenetriaminepentaacetic acid), HEDP (hydroxyethanediphosphonic acid), EDDS (ethylenediamine disuccinate (EDDS), DTPMP (diethylene triamine penta(methylene phosphonic acid)), EDTMP (ethylene diamine tetra(methylene phosphonic acid)), Tiron® (1,2-diydroxybenzene-3,5-disulfonic acid), HPNO (2-pyridinol-N-oxide), MGDA (methylglycinediacetic acid), GLDA (glutamic-N,N-diacetic acid), any suitable derivative thereof, salts thereof, and mixtures thereof.

The laundry detergent composition may comprise an antioxidant. Without wishing to be bound by theory, it is believed that antioxidants may help to improve malodor control and/or cleaning performance of the compositions, particularly in combination with the oligoamines of the present disclosure. Antioxidants may also help to reduce yellowing that may be associated with amines, allowing the amines to be formulated at a relatively higher level.

The laundry detergent composition may comprise a hindered phenol antioxidant in an amount of from 0.001% to 2%, preferably from 0.01% to 0.5%, by weight of the laundry detergent composition.

Suitable antioxidants may include alkylated phenols, having the general formula:

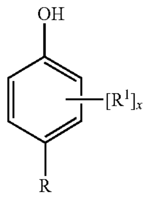

wherein R is $C_1$-$C_{22}$ linear alkyl or $C_3$-$C_{22}$ branched alkyl, each (1) having optionally therein one or more ester (—$CO_2$—) or ether (—O—) links, and (2) optionally substituted by an organic group comprising an alkyleneoxy or polyalkyleneoxy group selected from EO (ethoxy), PO (propoxy), BO (butoxy), and mixtures thereof, more preferably from EO alone or from EO/PO mixtures; R may preferably be methyl, branched $C_3$-$C_6$ alkyl, or $C_1$-$C_6$ alkoxy, preferably methoxy; $R^1$ is a $C_3$-$C_6$ branched alkyl, preferably tert-butyl; x is 1 or 2.

Preferred types of alkylated phenols having this formula may include hindered phenolic compounds. As used herein, the term "hindered phenol" is used to refer to a compound comprising a phenol group with either (a) at least one $C_3$ or higher branched alkyl, preferably a $C_3$-$C_6$ branched alkyl, preferably tert-butyl, attached at a position ortho to at least one phenolic —OH group, or (b) substituents independently selected from the group consisting of a $C_1$-$C_6$ alkoxy, preferably methoxy, a $C_1$-$C_{22}$ linear alkyl or $C_3$-$C_2$ branched alkyl, preferably methyl or branched $C_3$-$C_6$ alkyl, or mixtures thereof, at each position ortho to at least one phenolic —OH group. If a phenyl ring comprises more than one —OH group, the compound is a hindered phenol provided at least one such —OH group is substituted as described immediately above. Where any R group in the structure above comprises three or more contiguous monomers, that antioxidant is defined herein as a "polymeric hindered phenol antioxidant." Compositions according to the present disclosure may include a hindered phenol antioxidant. A preferred hindered phenol antioxidant includes 3,5-di-tert-butyl-4-hydroxytoluene (BHT).

A further class of hindered phenol antioxidants that may be suitable for use in the composition is a benzofuran or benzopyran derivative having the formula:

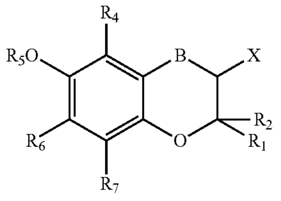

wherein $R_1$ and $R_2$ are each independently alkyl or $R_1$ and $R_2$ can be taken together to form a $C_5$-$C_6$ cyclic hydrocarbyl moiety; B is absent or $CH_2$; $R_4$ is $C_1$-$C_6$ alkyl; $R_5$ is hydrogen or —C(O)$R_3$ wherein $R_3$ is hydrogen or $C_1$-$C_{19}$ alkyl; $R_6$ is $C_1$-$C_6$ alkyl; $R_7$ is hydrogen or $C_1$-$C_6$ alkyl; X is —$CH_2$OH, or —$CH_2$A wherein A is a nitrogen-comprising unit, phenyl, or substituted phenyl. Preferred nitrogen-comprising A units include amino, pyrrolidino, piperidino, morpholino, piperazino, and mixtures thereof.

Suitable hindered phenol antioxidants may include: 2,6-bis(1,1-dimethylethyl)-4-methylphenol; 3,5-bis(1,1-dimethylethyl)-4-hydroxy-benzenepropanoic acid, methyl ester; 3,5-bis(1,1-dimethylethyl)-4-hydroxybenzenepropanoic acid, octadecyl ester; or mixtures thereof.

Commercially available antioxidants that may be suitable include BHT, RALOX 35™, and/or TINOGARD TS™.

Additional antioxidants may be employed. Examples of suitable antioxidants for use in the composition include, but are not limited to, the group consisting of □-, □-, □-, □-tocopherol, ethoxyquin, 2,2,4-trimethyl-1,2-dihydroquinoline, 2,6-di-tert-butyl hydroquinone, tert-butyl hydroxyanisole, lignosulphonic acid and salts thereof, and mixtures thereof. It is noted that ethoxyquin (1,2-dihydro-6-ethoxy-2,2,4-trimethylquinoline) is marketed under the name Raluquin™ by the company Raschig™. Other types of antioxidants that may be used in the composition are 6-hydroxy-2,5,7,8-tetramethylchroman-2-carboxylic acid (Trolox™) and 1,2-benzisothiazoline-3-one (Proxel GXL™). Antioxidants such as tocopherol sorbate, butylated hydroxyl benzoic acids and their salts, gallic acid and its alkyl esters, uric acid and its salts, sorbic acid and its salts, and dihydroxyfumaric acid and its salts may also be useful.

The use of non-yellowing antioxidants, such as non-yellowing hindered phenol antioxidants, may be preferred. Antioxidants that form such yellow by-products may be avoided if they lead to perceptible negative attributes in the consumer experience (such as deposition of yellow by-products on fabric, for example). The skilled artisan is able to make informed decisions regarding the selection of antioxidants to employ.

The liquid laundry detergent composition described above preferably has a pH between 6 and 10, more preferably between 6.5 and 8.9, most preferably between 7 and 8, wherein the pH of the liquid laundry detergent composition is measured as a neat pH. For assessment of liquid laundry detergent pH, wash liquor pH, or rinse liquor pH, a 50 ml aliquot may be sampled from a North America top loader machine which has an approximate volume of 64 Liters. Additionally, if the detergent is a solid laundry detergent, the solid laundry detergent preferably has a pH between 6 and 10, more preferably between 6.5 and 8.9, most preferably between 7 and 8, wherein the pH of the solid laundry detergent composition is measured as a 10% dilution in demineralized water at 20° C.

Laundry Detergent pH Below 6:

The detergent compositions may be low pH detergent compositions comprising sulfated surfactants, organic acid, and alkoxylated polyamine compounds. Sulfated surfactants provide, for example, cleaning benefits in compositions suitable for cleaning hard surfaces and/or laundry. In order to provide effective cleaning, especially for laundry, it is desirable for the sulfated surfactants to have alkyl groups of certain chain lengths, for example, at least 10 carbons, or at least 12 carbons, or at least 14 carbons. However, it is believed that longer alkyl chains tend to lead to more interfaces forming between the sulfated surfactants. This can present stability challenges as sulfated surfactants tend to hydrolyze in low pH systems, believed to be due in part to the interfaces between the surfactants. It has been surprisingly discovered that certain alkoxylated polyamine compounds can reduce the rate of hydrolysis. It is believed that the polyamines provide a stabilizing effect by interrupting $H^+$ access to the interface and/or by interrupting the interactions between the sulfated surfactants.

Organic Acid

The detergent composition having a pH below 6 comprises one or more organic acids selected from the group consisting of acetic acid, lactic acid, and citric acid.

The detergent compositions of the present invention may comprise an additional organic acid. The additional organic acid may be in the form of an organic carboxylic acid or polycarboxylic acid.

Examples of organic acids that may be used include: acetic acid, adipic acid, aspartic acid, carboxymethyloxymalonic acid, carboxymethyloxysuccinic acid, citric acid, formic acid, glutaric acid, hydroxyethyliminodiacetic acid, iminodiacetic acid, lactic acid, maleic acid, malic acid, malonic acid, oxydiacetic acid, oxydisuccinic acid, succinic acid, sulfamic acid, tartaric acid, tartaric-disuccinic acid, tartaric-monosuccinic acid, or mixtures thereof. In some aspects, the composition comprises organic acids that can also serve as detergent builders, such as citric acid.

The organic acid may be a water-soluble or water-miscible acid. In some aspects, the organic acid has a solubility in water at 20° C. of at least about 10 g acid/100 ml water, or at least about 30 g acid/100 ml water, or at least about 50 g acid/100 ml water, or at least about 70 g acid/100 ml water, or at least about 85 g/100 ml water. In some aspects, the composition is substantially free of fatty acid.

The organic acid may be a low-weight acid, for example, an acid having a molecular weight of less than 210 g/mole. In some aspects, the organic acid has no more than nine carbon atoms, alternatively no more than six carbon atoms. The organic acid in the detergent composition may have no more than four carbon atoms, or no more than three carbon atoms, or fewer than three carbon atoms. Specific examples of organic acids having fewer than three carbon atoms include formic acid and acetic acid.

In some aspects, the compositions of the present disclosure comprise from about 6% to about 30%, or from about 8% to about 25%, or from about 10% to about 15%, or from about 12% to about 17%, by weight of the composition, of the organic acid, such as, for example, 13%, 14%, 15%, 16%, 17%, 18%, 19%, 20%, 21%, 22%, 23%, 24%.

Unless otherwise stated herein, the pH of the composition is defined as the neat pH of the composition at 20±2° C. Any meter capable of measuring pH to ±0.01 pH units is suitable. Orion meters (Thermo Scientific, Clintinpark-Keppekouter, Ninovesteenweg 198, 9320 Erembodegem-Aalst, Belgium) or equivalent are acceptable instruments. The pH meter should be equipped with a suitable glass electrode with calomel or silver/silver chloride reference. An example includes Mettler DB 115. The electrode should be stored in the manufacturer's recommended electrolyte solution. The pH is measured according to the standard procedure of the pH meter manufacturer. Furthermore, the manufacturer's instructions to set up and calibrate the pH assembly should be followed.

Concentrated Acid Delivery Source:

The concentrated acid delivery source comprises of a fibrous water-soluble unit dose comprising an active agent as described below. As used herein, the phrases "water-soluble unit dose article," "water-soluble fibrous structure", and "water-soluble fibrous element" mean that the unit dose article, fibrous structure, and fibrous element are miscible in water. In other words, the unit dose article, fibrous structure, or fibrous element is capable of forming a homogeneous solution with water at ambient conditions. "Ambient conditions" as used herein means 23° C.±1.0° C. and a relative humidity of 50%±2%. The water-soluble unit dose article may contain insoluble materials, which are dispersible in aqueous wash conditions to a suspension mean particle size that is less than about 20 microns, or less than about 50 microns.

The fibrous water-soluble unit dose article may include any of the disclosures found in U.S. patent application Ser. No. 15/880,594 filed on Jan. 26, 2018; U.S. patent application Ser. No. 15/880,599 filed Jan. 26, 2018; and U.S. patent application Ser. No. 15/880,604 filed Jan. 26, 2018; incorporated by reference in their entirety.

These fibrous water-soluble unit dose articles can be dissolved under various wash conditions, e.g., low temperature, low water and/or short wash cycles or cycles where consumers have been overloading the machine, especially with items having high water absorption capacities, while providing sufficient delivery of active agents for the intended effect on the target consumer substrates (with similar performance as today's liquid products). Furthermore, the water-soluble unit dose articles described herein can be produced in an economical manner by spinning fibers comprising active agents. The water-soluble unit dose articles described herein also have improved cleaning performance.

The surface of the fibrous water-soluble unit dose article may comprise a printed area. The printed area may cover between about 10% and about 100% of the surface of the article. The area of print may comprise inks, pigments, dyes, bluing agents or mixtures thereof. The area of print may be opaque, translucent or transparent. The area of print may comprise a single color or multiple colors. The printed area may be on more than one side of the article and contain instructional text and/or graphics. The surface of the water-soluble unit dose article may comprise an aversive agent, for example a bittering agent. Suitable bittering agents include, but are not limited to, naringin, sucrose octacetate, quinine hydrochloride, denatonium benzoate, or mixtures thereof. Any suitable level of aversive agent may be used. Suitable levels include, but are not limited to, 1 to 5000 ppm, or even 100 to 2500 ppm, or even 250 to 2000 ppm.

The water-soluble unit dose may utilize the acid as the bittering agent, preferably citric acid and salts thereof. The citric acid may be combined with any one of the bittering agents previously stated. The citric acid may be used as the bittering agent within the article while a different bittering agent is used on the surface of the article.

The fibrous water-soluble unit dose articles may exhibit a thickness of greater than 0.01 mm and/or greater than 0.05 mm and/or greater than 0.1 mm and/or to about 100 mm and/or to about 50 mm and/or to about 20 mm and/or to about 10 mm and/or to about 5 mm and/or to about 2 mm and/or to about 0.5 mm and/or to about 0.3 mm as measured by the Thickness Test Method described herein.

The fibrous water-soluble unit dose articles may have basis weights of from about 500 grams/$m^2$ to about 5,000 grams/$m^2$, or from about 1,000 grams/$m^2$ to about 4,000 grams/$m^2$, or from about 1,500 grams/$m^2$ to about 3,500 grams/$m^2$, or from about 2,000 grams/$m^2$ to about 3,000 grams/$m^2$, as measured according to the Basis Weight Test Method described herein.

The fibrous water-soluble unit dose article may exhibit different regions, such as different regions of basis weight, density, caliper, and/or wetting characteristics. The fibrous water-soluble unit dose article may be compressed at the point of edge sealing. The fibrous water-soluble unit dose article may comprise texture on one or more of its surfaces. A surface of the fibrous water-soluble unit dose article may comprise a pattern, such as a non-random, repeating pattern. The fibrous water-soluble unit dose article may comprise apertures. The fibrous water-soluble unit dose article may comprise a fibrous structure having discrete regions of fibrous elements that differ from other regions of fibrous elements in the structure. The fibrous water-soluble unit dose article may be used as is or it may be coated with one or more active agents.

The fibrous water-soluble unit dose article may comprise one or more plies. The fibrous water-soluble unit dose article may comprise at least two and/or at least three and/or at least four and/or at least five plies. The fibrous plies can be fibrous structures. Each ply may comprise one or more layers, for example one or more fibrous element layers, one or more particle layers, and/or one or more fibrous element/particle mixture layers. The layer(s) may be sealed. In particular, particle layers and fibrous element/particle mixture layers may be sealed, such that the particles do not leak out. The water-soluble unit dose articles may comprise multiple plies, where each ply comprises two layers, where one layer is a fibrous element layer and one layer is a fibrous element/particle mixture layer, and where the multiple plies are sealed (e.g., at the edges) together. Sealing may inhibit the leakage of particles as well as help the unit dose article maintain its original structure. However, upon addition of the water-soluble unit dose article to water, the unit dose article dissolves and releases the particles into the wash liquor.

The fibrous water-soluble unit dose may be in the form of any three-dimensional structure. The fibrous water-soluble unit dose article can be perforated. The article can also be cut or shaped into various sizes for different intended uses. For example, the water-soluble unit dose may be in the form of a square, a rounded square, a kite, a rectangle, a triangle, a circle, an ellipse, and mixtures thereof.

The water-soluble unit dose articles disclosed herein comprise a water-soluble fibrous structure and one or more particles. The water-soluble fibrous structure may comprise a plurality of fibrous elements, for example a plurality of filaments. The one or more particles, for example one or more active agent-containing particles, may be distributed throughout the structure. The water-soluble unit dose article may comprise a plurality of two or more and/or three or more fibrous elements that are inter-entangled or otherwise associated with one another to form a fibrous structure and one or more particles, which may be distributed throughout the fibrous structure.

The fibrous water-soluble unit dose article may comprise a water-soluble fibrous structure and a plurality of particles distributed throughout the structure, where the water-soluble fibrous structure comprises a plurality of identical or substantially identical, from a compositional perspective, fibrous elements. The water-soluble fibrous structure may comprise two or more different fibrous elements. Non-limiting examples of differences in the fibrous elements may be physical differences, such as differences in diameter, length, texture, shape, rigidness, elasticity, and the like; chemical differences, such as crosslinking level, solubility, melting point, Tg, active agent, filament-forming material, color, level of active agent, basis weight, level of filament-forming material, presence of any coating on fibrous element, biodegradable or not, hydrophobic or not, contact angle, and the like; differences in whether the fibrous element loses its physical structure when the fibrous element is exposed to conditions of intended use; differences in whether the fibrous element's morphology changes when the fibrous element is exposed to conditions of intended use; and differences in rate at which the fibrous element releases one or more of its active agents when the fibrous element is exposed to conditions of intended use. Two or more fibrous elements within the fibrous structure may comprise different active agents. This may be the case where the different active agents may be incompatible with one another, for example an anionic surfactant and a cationic polymer. When using different fibrous elements, the resulting structure may exhibit different wetting, imbibitions, and solubility characteristics.

Fibrous Structure

Fibrous structures comprise one or more fibrous elements. The fibrous elements can be associated with one another to form a structure. Fibrous structures can include particles within and or on the structure. Fibrous structures can be homogeneous, layered, unitary, zoned, or as otherwise desired, with different active agents defining the various aforesaid portions.

A fibrous structure can comprise one or more layers, the layers together forming a ply.

Fibrous Elements

The fibrous elements may be water-soluble. The fibrous elements may comprise one or more filament-forming materials and/or one or more active agents, such as a surfactant. The one or more active agents may be releasable from the fibrous element, such as when the fibrous element and/or fibrous structure comprising the fibrous element is exposed to conditions of intended use.

The fibrous elements of the present invention may be spun from a filament-forming composition, also referred to as fibrous element-forming compositions, via suitable spinning process operations, such as meltblowing, spunbonding, electro-spinning, and/or rotary spinning.

"Filament-forming composition" and/or "fibrous element-forming composition" as used herein means a composition that is suitable for making a fibrous element of the present invention such as by meltblowing and/or spunbonding. The filament-forming composition comprises one or more filament-forming materials that exhibit properties that make them suitable for spinning into a fibrous element. The filament-forming material may comprise a polymer. In addition to one or more filament-forming materials, the filament-forming composition may comprise one or more active agents, for example, a surfactant. In addition, the filament-forming composition may comprise one or more polar solvents, such as water, into which one or more, for example all, of the filament-forming materials and/or one or more, for example all, of the active agents are dissolved and/or dispersed prior to spinning a fibrous element, such as a filament from the filament-forming composition.

The filament-forming composition may comprise two or more different filament-forming materials. Thus, the fibrous elements may be monocomponent (one type of filament-forming material) and/or multicomponent, such as bicomponent. The two or more different filament-forming materials may be randomly combined to form a fibrous element. The two or more different filament-forming materials may be orderly combined to form a fibrous element, such as a core and sheath bicomponent fibrous element, which is not considered a random mixture of different filament-forming materials for purposes of the present disclosure. Bicomponent fibrous elements may be in any form, such as side-by-side, core and sheath, islands-in-the-sea and the like.

The fibrous elements may be substantially free of alkylalkoxylated sulfate. Each fibrous element may comprise from about 0%, or from about 0.1%, or from about 5%, or from about 10%, or from about 15%, or from about 20%, or from about 25%, or from about 30%, or from about 35%, or from about 40% to about 0.2%, or to about 1%, or to about 5%, or to about 10%, or to about 15%, or to about 20%, or to about 25%, or to about 30%, or to about 35% or to about 40%, or to about 50% by weight on a dry fibrous element basis of an alkylalkoxylated sulfate. The amount of alkylalkoxylated sulfate in each of the fibrous elements is sufficiently small so as not to affect the processing stability and film dissolution thereof. Alkylalkoxylated sulfates, when dissolved in water, may undergo a highly viscous hexagonal phase at certain concentration ranges, e.g., 30-60% by weight, resulting in a gel-like substance. Therefore, if incorporated into the fibrous elements in a significant amount, alkylalkoxylated sulfates may significantly slow down the dissolution of the water-soluble unit dose articles in water, and worse yet, result in undissolved solids afterwards. Correspondingly, most of such surfactants are formulated into the particles.

The fibrous elements may each contain at least one filament-forming material and an active agent, preferably a surfactant. The surfactant may have a relatively low hydrophilicity, as such a surfactant is less likely to form a viscous, gel-like hexagonal phase when being diluted. By using such a surfactant in forming the filaments, gel-formation during wash may be effectively reduced, which in turn may result in faster dissolution and low or no residues in the wash. The surfactant can be selected, for example, from the group consisting of unalkoxylated $C_6$-$C_{20}$ linear or branched alkyl sulfates (AS), $C_6$-$C_{20}$ linear alkylbenzene sulfonates (LAS), and combinations thereof. The surfactant may be a $C_6$-$C_{20}$ linear alkylbenzene sulfonates (LAS). LAS surfactants are well known in the art and can be readily obtained by sulfonating commercially available linear alkylbenzenes. Exemplary $C_6$-$C_{20}$ linear alkylbenzene sulfonates that can be used include alkali metal, alkaline earth metal or ammonium salts of $C_6$-$C_{20}$ linear alkylbenzene sulfonic acids, such as the sodium, potassium, magnesium and/or ammonium salts of $C_{11}$-$C_{18}$ or $C_{11}$-$C_{14}$ linear alkylbenzene sulfonic acids. The sodium or potassium salts of $C_{12}$ linear alkylbenzene sulfonic acids, for example, the sodium salt of $C_{12}$ linear alkylbenzene sulfonic acid, i.e., sodium dodecylbenzene sulfonate, may be used as the first surfactant.

The fibrous element may comprise at least about 5%, and/or at least about 10%, and/or at least about 15%, and/or at least about 20%, and/or less than about 80%, and/or less than about 75%, and/or less than about 65%, and/or less than about 60%, and/or less than about 55%, and/or less than about 50%, and/or less than about 45%, and/or less than about 40%, and/or less than about 35%, and/or less than about 30%, and/or less than about 25% by weight on a dry fibrous element basis and/or dry fibrous structure basis of the filament-forming material and greater than about 20%, and/or at least about 35%, and/or at least about 40%, and/or at least about 45%, and/or at least about 50%, and/or at least about 55%, and/or at least about 60%, and/or at least about 65%, and/or at least about 70%, and/or less than about 95%, and/or less than about 90%, and/or less than about 85%, and/or less than about 80%, and/or less than about 75% by weight on a dry fibrous element basis and/or dry fibrous structure basis of an active agent, preferably surfactant. The fibrous element may comprise greater than about 80% by weight on a dry fibrous element basis and/or dry fibrous structure basis of surfactant.

Preferably, each fibrous element may be characterized by a sufficiently high total surfactant content, e.g., at least about 30%, or at least about 40%, or at least about 50%, or at least about 60%, or at least about 70%, by weight on a dry fibrous element basis and/or dry fibrous structure basis of the first surfactant.

The total level of filament-forming materials present in the fibrous element may be from about 5% to less than about 80% by weight on a dry fibrous element basis and/or dry fibrous structure basis and the total level of surfactant present in the fibrous element may be greater than about 20% to about 95% by weight on a dry fibrous element basis and/or dry fibrous structure basis.

One or more of the fibrous elements may comprise at least one additional surfactant selected from the group consisting of other anionic surfactants (i.e., other than AS and LAS), nonionic surfactants, zwitterionic surfactants, amphoteric surfactants, cationic surfactants, and combinations thereof.

Other suitable anionic surfactants include $C_6$-$C_{20}$ linear or branched alkyl sulfonates, $C_6$-$C_{20}$ linear or branched alkyl carboxylates, $C_6$-$C_{20}$ linear or branched alkyl phosphates, $C_6$-$C_{20}$ linear or branched alkyl phosphonates, $C_6$-$C_{20}$ alkyl N-methyl glucose amides, $C_6$-$C_{20}$ methyl ester sulfonates (MES), and combinations thereof.

Suitable nonionic surfactants include alkoxylated fatty alcohols. The nonionic surfactant may be selected from ethoxylated alcohols and ethoxylated alkyl phenols of the formula $R(OC_2H_4)_nOH$, wherein R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15. Non-limiting examples of nonionic surfactants useful herein include: $C_8$-$C_{18}$ alkylethoxylates, such as, NEODOL® nonionic surfactants from Shell; $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols, BA; $C_{14}$-$C_{22}$ mid-chain branched alkylalkoxylates, $BAE_x$, wherein x is from 1 to 30; alkylpolysaccharides; specifically alkylpolyglycosides; polyhydroxy fatty acid amides; and ether capped poly(oxyalkylated) alcohol surfactants. Suitable nonionic detersive surfactants also include alkyl polyglucoside and alkylalkoxylated alcohol. Suitable nonionic surfactants also include those sold under the tradename Lutensol® from BASF.

Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, e.g., amido propyldimethyl amine (APA). Suitable cationic detersive surfactants also include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

$$(R)(R_1)(R_2)(R_3)N^+X^-$$

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, for example chloride; sulfate; and sulfonate. Suitable cationic detersive surfactants are mono-$C_{6-18}$ alkyl mono-hydroxyethyl di-methyl quaternary ammonium chlorides. Highly suitable cationic detersive surfactants are mono-$C_{8-10}$ alkyl mono-hydroxyethyl di-methyl quaternary ammonium chloride, mono-$C_{10}$ alkyl mono-hydroxyethyl di-methyl quaternary ammonium chloride and mono-$C_{10}$ alkyl mono-hydroxyethyl di-methyl quaternary ammonium chloride.

Suitable examples of zwitterionic surfactants include: derivatives of secondary and tertiary amines, including derivatives of heterocyclic secondary and tertiary amines; derivatives of quaternary ammonium, quaternary phosphonium or tertiary sulfonium compounds; betaines, including alkyl dimethyl betaine, cocodimethyl amidopropyl betaine, and sulfo and hydroxy betaines; $C_8$ to $C_{18}$ (e.g., from $C_{12}$ to $C_{18}$) amine oxides; N-alkyl-N,N-dimethylammino-1-propane sulfonate, where the alkyl group can be $C_8$ to $C_{18}$.

Suitable amphoteric surfactants include aliphatic derivatives of secondary or tertiary amines, or aliphatic derivatives of heterocyclic secondary and tertiary amines in which the aliphatic radical may be straight or branched-chain and where one of the aliphatic substituents contains at least about 8 carbon atoms, or from about 8 to about 18 carbon atoms, and at least one of the aliphatic substituents contains an anionic water-solubilizing group, e.g. carboxy, sulfonate, sulfate. Suitable amphoteric surfactants also include sarcosinates, glycinates, taurinates, and mixtures thereof.

The fibrous elements may comprise a surfactant system containing only anionic surfactants, e.g., either a single anionic surfactant or a combination of two or more different anionic surfactants. Alternatively, the fibrous elements may include a composite surfactant system, e.g., containing a combination of one or more anionic surfactants with one or more nonionic surfactants, or a combination of one or more anionic surfactants with one or more zwitterionic surfactants, or a combination of one or more anionic surfactants with one or more amphoteric surfactants, or a combination of one or more anionic surfactants with one or more cationic surfactants, or a combination of all the above-mentioned types of surfactants (i.e., anionic, nonionic, amphoteric and cationic).

In general, fibrous elements are elongated particulates having a length greatly exceeding average diameter, e.g., a length to average diameter ratio of at least about 10. A fibrous element may be a filament or a fiber. Filaments are relatively longer than fibers. A filament may have a length of greater than or equal to about 5.08 cm (2 in.), and/or greater than or equal to about 7.62 cm (3 in.), and/or greater than or equal to about 10.16 cm (4 in.), and/or greater than or equal to about 15.24 cm (6 in.). A fiber may have a length of less than about 5.08 cm (2 in.), and/or less than about 3.81 cm (1.5 in.), and/or less than about 2.54 cm (1 in.).

The one or more filament-forming materials and active agents may be present in the fibrous element at a weight ratio of total level of filament-forming materials to active agents of about 2.0 or less, and/or about 1.85 or less, and/or less than about 1.7, and/or less than about 1.6, and/or less than about 1.5, and/or less than about 1.3, and/or less than about 1.2, and/or less than about 1, and/or less than about 0.7, and/or less than about 0.5, and/or less than about 0.4, and/or less than about 0.3, and/or greater than about 0.1, and/or greater than about 0.15, and/or greater than about 0.2. The one or more filament-forming materials and active agents may be present in the fibrous element at a weight ratio of total level of filament-forming materials to active agents of about 0.2 to about 0.7.

The fibrous element may comprise from about 10% to less than about 80% by weight on a dry fibrous element basis and/or dry fibrous structure basis of a filament-forming material, such as polyvinyl alcohol polymer, starch polymer, and/or carboxymethylcellulose polymer, and greater than about 20% to about 90% by weight on a dry fibrous element basis and/or dry fibrous structure basis of an active agent, such as surfactant. The fibrous element may further comprise a plasticizer, such as glycerin, and/or additional pH adjusting agents, such as citric acid. The fibrous element may have a weight ratio of filament-forming material to active agent of about 2.0 or less. The filament-forming material may be selected from the group consisting of polyvinyl alcohol, starch, carboxymethylcellulose, polyethylene oxide, and other suitable polymers, especially hydroxyl-containing polymers and their derivatives. The filament-forming material may range in weight average molecular weight from about 100,000 g/mol to about 3,000,000 g/mol. It is believed that in this range, the filament-forming material may provide extensional rheology, without being so elastic that fiber attenuation is inhibited in the fiber-making process.

The one or more active agents may be releasable and/or released when the fibrous element and/or fibrous structure comprising the fibrous element is exposed to conditions of intended use. The one or more active agents in the fibrous element may be selected from the group consisting of surfactants, organic polymeric compounds, and mixtures thereof.

The fibrous elements may exhibit a diameter of less than about 300 μm, and/or less than about 75 μm, and/or less than about 50 μm, and/or less than about 25 μm, and/or less than about 10 μm, and/or less than about 5 μm, and/or less than about 1 μm as measured according to the Diameter Test Method described herein. The fibrous elements may exhibit a diameter of greater than about 1 μm as measured according to the Diameter Test Method described herein. The diameter of a fibrous element may be used to control the rate of release of one or more active agents present in the fibrous element and/or the rate of loss and/or altering of the fibrous element's physical structure.

The fibrous element may comprise two or more different active agents, which are compatible or incompatible with one another. The fibrous element may comprise an active agent within the fibrous element and an active agent on an external surface of the fibrous element, such as an active agent coating on the fibrous element. The active agent on the external surface of the fibrous element may be the same or different from the active agent present in the fibrous element. If different, the active agents may be compatible or incompatible with one another. The one or more active agents may be uniformly distributed or substantially uniformly distributed throughout the fibrous element. The one or more active agents may be distributed as discrete regions within the fibrous element.

Active Agents

The water-soluble unit dose articles described herein may contain one or more active agents. The active agents may be present in the fibrous elements in the form of distinct particles, in the form of or integrated into particles, or as a premix in the article. Premixes for example, may be slurries of active agents that are combined with aqueous absorbents.

The active agent may be an acid. Examples of acids suitable for use include, but are not limited to, organic acids selected from the group consisting of acetic acid, adipic acid, aspartic acid, carboxymethyloxymalonic acid, carboxymethyloxysuccinic acid, citric acid, benzoic acid, formic acid, glutaric acid, glutonic acid, hydroxyethyliminodiacetic acid, iminodiacetic acid, lactic acid, maleic acid, malic acid, malonic acid, oxydiacetic acid, oxydisuccinic acid, succinic acid, sulfamic acid, tartaric acid, tartaric-disuccinic acid, tartaric-monosuccinic acid, their salts or mixtures thereof, either alone or in combination. Preferably, the acid is citric acid, lactic acid, acetic acid, and/or tartaric acid, and more preferably citric acid.

In certain aspects, the acid comprises a coating. The coating can help prevent the active agent from prematurely dissolving. A preferred acid is citric acid and preferred coatings include maltodextrin, waxes, citrate, sulfate, zeolites, anti-caking agents such as silicon dioxide or other desiccants. Preferred combinations include citric acid coated with maltodextrin (available under the tradename Citric Acid DC), citric acid coated with citrate (available under the tradename CITROCOAT® N), or citric acid coated with silicon dioxide (available under the tradename Citric Acid S40).

The active agent may be incorporated into the water-soluble unit dose composition at a level of from about 5% to about 90%, preferably from about 10% to about 80%, preferably from about 15% to about 75%, preferably from about 40% to about 70%, preferably from about 60% to about 70%, by weight of the article. The active agent may be incorporated as distinct particles, encapsulated particles, as particles in a slurry, as part of the fibers, or as a mixture thereof.

The water-soluble unit dose may comprise one or more additional organic acids. The additional organic acid may be in the form of an organic carboxylic acid or polycarboxylic acid. Examples of organic acids that may be used include: acetic acid, adipic acid, aspartic acid, benzoic acid, carboxymethyloxymalonic acid, carboxymethyloxysuccinic acid, citric acid, formic acid, glycolic acid, benzoic acid, gluconic acid, glutaric acid, hydroxyethyliminodiacetic acid, iminodiacetic acid, lactic acid, maleic acid, malic acid, malonic acid, oxydiacetic acid, oxydisuccinic acid, succinic acid, sulfamic acid, tartaric acid, tartaric-disuccinic acid, tartaric-monosuccinic acid, their salts or mixtures thereof. In some aspects, the composition comprises organic acids that can also serve as detergent builders, such as citric acid.

The water soluble unit dose may further comprise acids with a pKa of from about 1.0 to about 5.0. Suitable acids within this pKa range can be found but not limited to those in the CRC Handbook of Chemistry and Physics, $99^{th}$ edition, Taylor & Francis.

The organic acid may be a water-soluble or water-miscible acid. In some aspects, the organic acid has a solubility in water at 20° C. of at least about 10 g acid/100 ml water, or at least about 30 g acid/100 ml water, or at least about 50 g acid/100 ml water, or at least about 70 g acid/100 ml water, or at least about 85 g/100 ml water. In some aspects, the composition is substantially free of fatty acid.

The organic acid may be a low-weight acid, for example, an acid having a molecular weight of less than 210 g/mole. In some aspects, the organic acid has no more than nine carbon atoms, alternatively no more than six carbon atoms. The organic acid in the detergent composition may have no more than four carbon atoms, or no more than three carbon atoms, or fewer than three carbon atoms. Specific examples of organic acids having fewer than three carbon atoms include formic acid and acetic acid.

FIG. 1 shows a first ply 10 and a second ply 15 associated with the first ply 10, wherein the first ply 10 and the second ply 15 each comprises a plurality of fibrous elements 30, in this case filaments, and a plurality of particles 32. In the second ply 15, the particles 32 are dispersed randomly, in the x, y, and z axes, and in the first ply, the particles 32 are in pockets.

Figure 2:
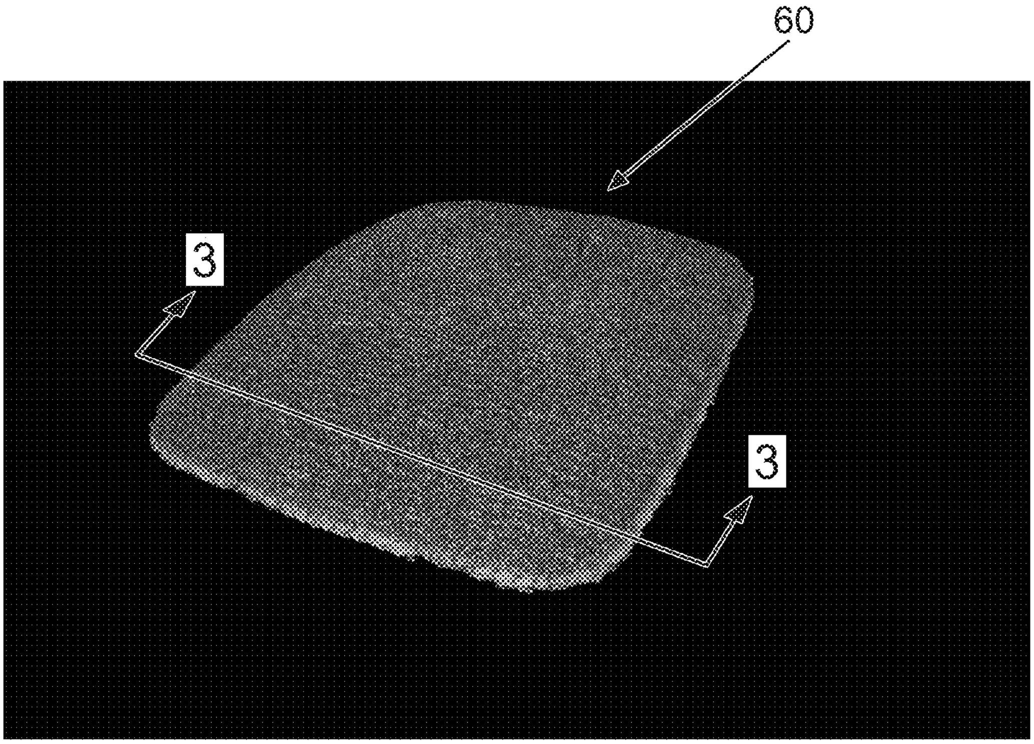
FIG. 2 is a perspective view of an example of a water-soluble unit dose article.

FIG. 2 is a perspective view of a water-soluble unit dose 60.

Figure 3:
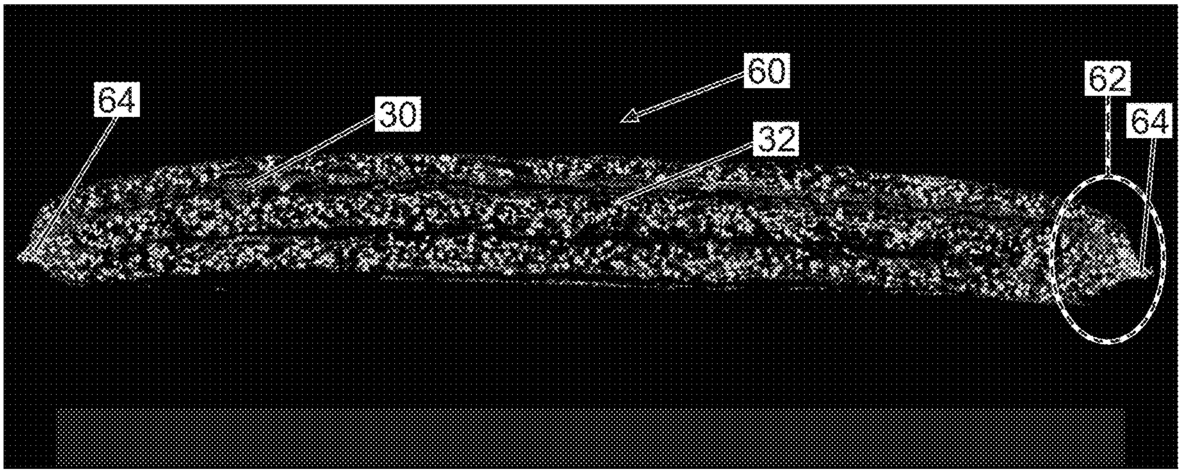
FIG. 3 is a micro-CT scan image showing a cross-sectional view of the example of a water-soluble unit dose article taken along line 3-3.

FIG. 3 is a micro-CT scan image showing a cross-sectional view of an example of the water-soluble unit dose article of FIG. 2 taken along line 3-3. The water-soluble unit dose having a fibrous element layer and a fibrous element/particle mixture layer. The water-soluble unit dose comprises a plurality of fibrous elements 30, in this case filaments, and a plurality of particles 32. The multiply, multilayer article is sealed at the edges 64, so that the particles do not leak out. The outer surfaces of the article are fibrous element layers. As shown in FIG. 3, the particles 32 do not agglomerate between the fibers and can be seen as individual particles.

Figure 4:
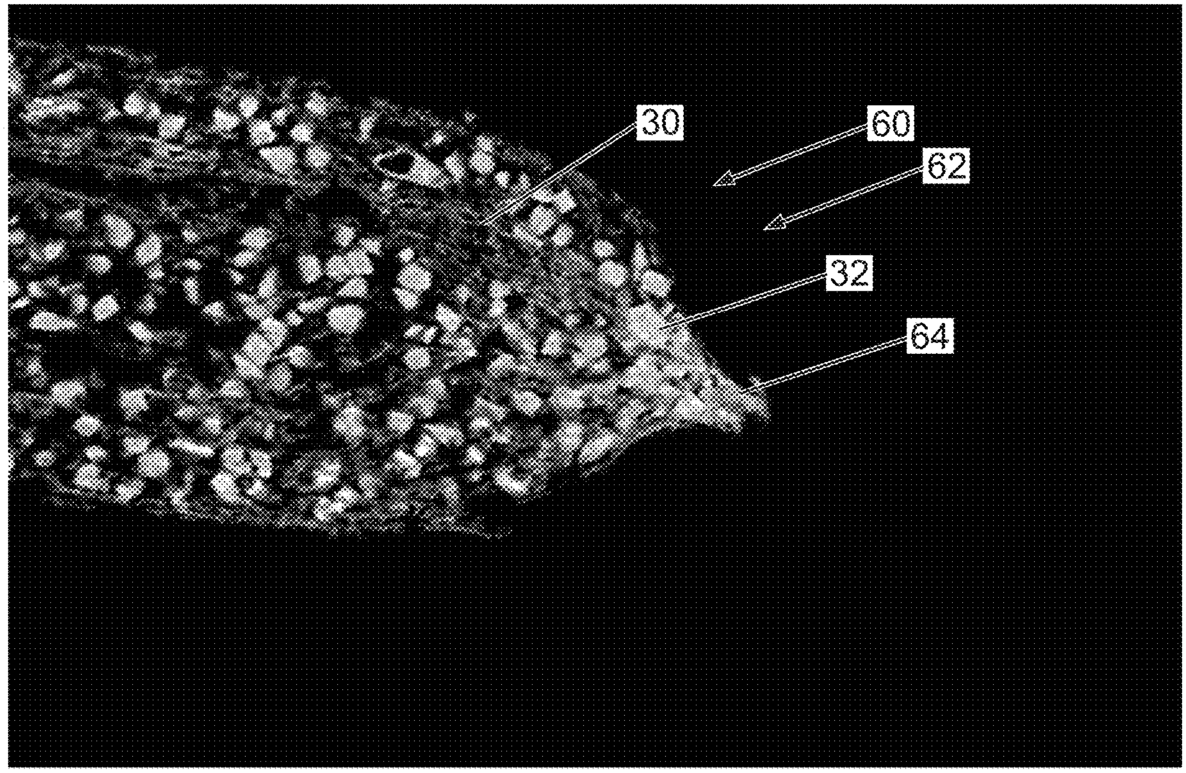
FIG. 4 is a magnified view of a portion of FIG. 3.

FIG. 4 is a magnified view 62 of a portion of FIG. 3. As shown in FIG. 4, the sealing edge 64 of the water-soluble unit dose 60 comprises of one or more particles 32 of citric acid.

Tested Compositions for Examples:

The tests below compare multiple detergents, rinses, and the concentrated acid delivery source described herein, alone and in combinations. Specifically, the use of 9 elements Low pH Formula Detergent, a Mid-pH (pH of 8.5) formula detergent, and Platinum Advanced Shirt& Laundry Detergent when using both an acid rinse (9 Elements Rinse) and the concentrated acid delivery system of the present invention.

TABLE 1

| Detergent Compositions | |
|---|---|
| Detergent | Ingredients/Composition |
| 9 Elements Detergent Formulation | HLAS, Nonionic surfactant, amine oxide, citric acid, sodium hydroxide, acetic acid, biobased propylene glycol, perfume, deionized water. |

9 Elements detergent compositions are further described in U.S. Patent Application No. 62/756,855 filed on Nov. 7, 2018 (first named inventor Delaney, Sarah Ann; herein incorporated by reference.

All Free and Clear Liquid Detergent is a North American liquid detergent composition owned by the Henkel AG & Company, KGaA, which contains AES, LAS, and Non-Ionic surfactants as well as an array enzymes.

Persil ProClean PRO10 Original liquid detergent is a North American liquid detergent composition owned by the Henkel AG & Company, KGaA, which contains AES, LAS, and Non-Ionic surfactants as well as an array of protease, amylase and cellulase enzymes.

9 Elements rinse which comprises of the following composition: Citric Acid, Vinegar (6% Acetic acid), Sodium Hydroxide, 1,2 propanediol, perfume, and deionized water. 9 Elements rinse is described in U.S. Patent Application No. 62/756,672 filed on Nov. 7,2018 (first inventor Delaney, Sarah Ann); herein incorporated by reference.

The concentrated acid delivery system described above is exemplified by the table below having the following composition according to the present disclosure. The concentrated acid delivery system is also described as a Power Tab in the malodor data below.

TABLE 2

Concentrated Acid Delivery Source Composition

| Name Raw Material | Citrocoat Particle (%) | Web (%) | Finished Pad (g) | Finished Pad (%) |
|---|---|---|---|---|
| NaAS (from fiber) | 0.00% | 21.56% | 0.80 | 6.63% |
| NaLAS (from fiber & particle) | 0.00% | 43.11% | 1.60 | 13.26% |
| Citrocoat (from particle) | 100.00% | 0.00% | 8.38 | 69.23% |
| PVOH 505 (from fiber) | 0.00% | 29.33% | 1.09 | 9.03% |
| PEOn10 (from fiber) | 0.00% | 2.60% | 0.10 | 0.80% |
| PEOn60k (from fiber) | 0.00% | 0.40% | 0.01 | 0.12% |
| Misc & Moisture | 0.00% | 3.00% | 0.11 | 0.92% |
| Web TOTAL | 100.00% | 100.00% | 12.10 | 100.00% |
| Charm TOTAL | | | 12.10 | 100.00% |
| Pad/Dose | | | 1.00 | |
| Surfactant/Dose (g) | | | 2.41 | |
| PVOH/Dose (g) | | | 1.20 | |
| Dose Wt | | | 12.10 | |
| % LAS | | | 67% | |
| 6" × 1 m Weight (g) (193 OK) | | | 130 | |
| Total Product Basis Wt (GSM) (ET4 = 3333) | | | 2574 | |

LAS is linear alkylbenzenesulfonate having an average aliphatic carbon chain length $C_{11}$-$C_{12}$ supplied by Stepan, Northfield, Illinois, USA or Huntsman Corp. HLAS is acid form.

AS is a $C_{12-14}$ sulfate, supplied by Stepan, Northfield, Illinois, USA, and/or a mid-branched alkyl sulfate.

PEG-PVAc polymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units. Available from BASF (Ludwigshafen, Germany).

Ethoxylated Polyethylenimine (PE20) is a 600 g/mol molecular weight polyethylenimine core with 20 ethoxylate groups per —NH. Available from BASF (Ludwigshafen, Germany).

Citrocoat (NF5000) is available from Jungbunzlauer (Basel, Switzerland).

PVOH and Celvol® are available from Sekisui Specialty Chemicals America, LLC located in Dallas Texas.

Determination of pH

Unless otherwise stated herein, the pH of the composition is defined as the neat pH of the composition at 20±2° C. Any meter capable of measuring pH to ±0.01 pH units is suitable. Orion meters (Thermo Scientific, Clintinpark-Keppekouter, Ninovesteenweg 198, 9320 Erembodegem-Aalst, Belgium) or equivalent are acceptable instruments. The pH meter should be equipped with a suitable glass electrode with calomel or silver/silver chloride reference. An example includes Mettler DB 115. The electrode should be stored in the manufacturer's recommended electrolyte solution. The pH is measured according to the standard procedure of the pH meter manufacturer. Furthermore, the manufacturer's instructions to set up and calibrate the pH assembly should be followed.

Malodor Removal Washing Test

The objective of the malodor removal washing test is to cross-compare the ability of different wash processes to reduce malodor on fabrics. A malodor cocktail is applied on laundry items to be washed in a subsequent full scale washing scale, after which the amount of remaining malodor actives on dried fabrics is analytically determined through GC-MS headspace SPME analysis. Each product is tested on 8 different washing machines, each washing machine comprising 16 malodor tracers (hence 64 replicates in total), and individual results are averaged and reported.

1) Washing Step:
   - Washing machine: High Efficiency Front Loading machine (Duet9200)
   - Washing cycle: normal cycle, 19.6 L water in wash cycle, 7 gpg, 25° C., 3.9 kg mixed cotton/polycotton ballast load (50×50 cm knit swatches: 17 cotton/12 polycotton), 16 malodor tracers (2×5 inch polycotton (50/50) swatches)
   - Washing product: one soluble unit dose comprising 25.4 g of test detergent
2) Drying Step:
   - Drying machine: Maytag Double Stack
   - Drying cycle: 35 minutes at 60-65° C. (setting: LOW)
   - Storage: dried swatches are placed in a Mylar bag (Polyester resin coated aluminum bags used to store fabrics until evaluation) sealed with a heat sealer for storage prior to analytical testing.
3) Analytical Malodor Characterization:

The principle behind the analytical malodor characterization technique is that the physical properties of malodor components require the component to have a low vapor pressure and/or a low odor detection threshold. Having these properties allows for the malodor to partition into the headspace. Therefore, headspace measurements above fabrics can be made to determine the amount of malodor on a fabric swatch.

The analysis is conducted with a Gas Chromatograph 7890B equipped with a Mass Selective Detector (MSD) (5977B) and Chemstation quantitation package, connected with a Gerstel Multi-Purpose sampler equipped with a solid phase micro-extraction (SPME) probe and with a DB-FFAP column Agilent part #122-3232. A Divinylbenzene/Carboxen/Polydimethylsiloxane SPME fiber from Supleco part #57298-U (or similar fiber) is used.

A malodor tracer is cut to a 2"×2.5" piece and placed in a 10 mL headspace crimp vial (Restek-part #21165-221). The tracer is allowed to equilibrate for 12 hours in the vial prior to GC-MS headspace SPME analysis.

GC-MS Parameters:

Gerstel Auto Sampler Parameters
SPME: from Incubator
Incubation Temperature: 80° C.
Incubation Time: 90.00 min
Sample Tray Type: VT32-10
Vial Penetration: 22.00 mm Extraction Time: 20.00 min
Inj. Penetration: 54.00 mm
Desorption Time: 300 s
GC Oven Parameter
Front SS Inlet He
Mode Split
Heater: 250° C.
Pressure: 11.962 psi
Total Flow: 79.5 mL/min
Septum Purge Flow: 3 mL/min
Split Ratio: 50:1
GC Run Time: 22.5 min
Oven
Initial temperature: 40° C.
Hold Time: 0 min
Heating Program
Rate: 12° C./min
Temperature: 250° C.
Hold Time: 5 min MSD Parameters Detection is run in scan mode with a minimum range of 40 to 350 m/z. A target ion for quantification is determined for each malodor component along with a minimum of 1 qualifier ion, preferably 2. The defined target and qualifier ions for each component must be based on an MSD compound library or standard.

Calibration curves are generated from standards in mineral oil for each malodor material. Utilizing the calibration headspace response, the integration of the extracted ion (EIC) for each malodor component in the test samples is plotted or recorded and averaged across replicates.

Artificial body soil (ABS)-squalene oxidation markers have been specifically analyzed for and are summarized together in the data shown below. More specifically ABS-squalene oxidation markers used are 3-methylbutenal, 2-heptenal and 6-methyl-5-hepten-2-one.

Materials:

1) Preparation Malodor Tracers:

Malodor tracers are prepared by applying the freshly made malodor cocktail to polycotton (PC) (50/50) swatches in which fabric finishes applied to fabrics at the textile mill that could potentially cause interference are removed. The malodor cocktail is applied to 2×5 inch polycotton 50/50 swatches the same morning as the full scale runs are conducted. PC 50/50 swatches are supplied by APD (Accurate Product Development, global materials supplier located in Cincinnati, Ohio).

An Integra Viaflo Automatic Pipette is used to apply the malodor cocktail on the PC 50/50 swatches. A 96-channel head (8 rows of 12 tips) and 300 µl pipette tips are used. For this test 5 rows of 12 tips are used to apply the malodor cocktail on a fabric tracer. Each tip applies 15 µl on the fabric tracer. 16 malodor cocktail comprising fabric tracers are prepared and wrapped together in an Aluminium foil for storage till beginning of the washing test.

2) Malodor Cocktail Composition:

The following malodor cocktail has been prepared through mixing of the individual compounds:

TABLE 3

Malodor cocktail

| Malodor cocktail | Order Of Addition | weight (g) |
|---|---|---|
| ABS from APD | 2 | 27 |
| Squalene (CAS: 111-02-4) | 3 | 27 |

Test Results:

The data shown in the table below show a significant reduction in oxidative bi-products of ABS and squalene for all Example formulations. The example formulations include:

The significant reduction in oxidative bi-products of ABS and squalene indicates a significantly improved malodor reduction profile for the example versus the reference formulations.

TABLE 4

Malodor Test Design and Results

| WASH TREATMENT | RESULT (mmol/L headspace) | LOWER 95% | UPPER 95% |
|---|---|---|---|
| 9-Elements Detergent | 127.32 | 89.20 | 181.74 |
| Persil ProClean PRO10 Original Detergent | 66.36 | 46.49 | 94.71 |
| 9-Elements Detergent & 9-Elements PowerTab | 37.52 | 26.28 | 53.55 |
| 9-Elements Detergent & 9-Elements Rinse | 36.98 | 25.91 | 52.79 |
| 9-Elements Detergent & 9-Elements Rinse & 9-Elements PowerTab | 22.39 | 15.68 | 31.96 |

As shown in the table above, the addition of the power Tab allows for a greater reduction in malodor (37.52 vs 127.32) at 95% significance versus 9-Elements detergent alone and an even greater reduction when combined with an additional acid rinse softener (22.39 vs 127.32) at 95% significance. Furthermore, addition of the power Tab to a detergent like 9-Elements can enable malodor reduction above even premium liquid detergents like Persil ProClean PRO10 (37.52 vs 66.36) at 95% confidence. This occurs even though the PowerTab was used in a wash liquor during the wash cycle.

Stain Removal

Stain Removal testing is conducted in Front Loader HE machines, in line with the guidance provided by ASTM4265-14 Standard Guide for Evaluating Stain Removal Performance in Home Laundering. Technical stain swatches of cotton CW120 containing 22 stains were purchased. The stained swatches were washed in conventional North American washing machines (Whirlpool®) using 7 grains per gallon hardness, selecting the normal cycle at 86 F, using each of the respective detergent compositions listed in the table below. Image analysis was used to compare each stain to an unstained fabric control. Software converted images taken into standard colorimetric values and compared these to standards based on the commonly used Macbeth Colour Rendition Chart, assigning each stain a colorimetric value (Stain Level). Eight replicates of each were prepared. The stain removal index was then calculated according to the formula shown below.

Stain removal from the swatches was measured as follows:

$$\text{Stain Removal Index } (SRI) = \frac{\Delta E_{initial} - \Delta E_{washed}}{\Delta E_{initial}} \times 100$$

$\Delta E_{initial}$=Stain level before washing $\Delta_{washed}$=Stain level after washing

EXAMPLES

The examples provided below are intended to be illustrative in nature and are not intended to be limiting.

Example 1

Illustrative Compositions

Table 1 shows compositions according to present disclosure. Sarah to add:

All Free & Clear Detergent (Market product)

9 Elements PowerTab

Stain Removal

Example

Effect of Adding a Citric-Based PowerTab Booster in the Wash Process to Suppress Water Liquor pH This example demonstrates the improved stain removal efficacy achieved via adding the 9-Elements PowerTab citric acid formulation in the wash, on top of a traditional market detergent All® Free & Clear Liquid. As acid is added into the wash step of the laundry cycle, the ability of citric acid to act as a builder scavenging metals in the wash enables stain removal of metal-sensitive stains that traditional detergents cannot efficiently remove due to their formulated pH (typically in the pH ranges of 7-9).

In order to assess the impact of adding the 9 Elements PowerTab citric booster in the wash on top of a traditional (median pH) detergent, stain removal testing was conducted. Results are provided in Table 5.

TABLE 5

Stain Removal results in Front Loader HE machines and Cotton Fabrics

| Soil | All Free and Clear Detergent | All Free and Clear Detergent + 9 Elements Power Tab | Honestly Significant Difference |
|---|---|---|---|
| Animal Blood | 93.5 | 81.1 | 9.54 |
| Mustard | 47.9 | 41.4 | 5.96 |
| Grape Juice | 61.7 | 78.0 | 7.74 |
| Gravy | 82.5 | 73.0 | 6.25 |
| Coffee | 57.8 | 68.7 | 6.61 |
| Liquid Make-Up | 45.8 | 55.4 | 4.38 |
| Soy Milk | 3.1 | 9.1 | 3.18 |
| Tea | 14.8 | 72.5 | 14.64 |
| Red Wine | 49.4 | 65.9 | 7.08 |

As shown in Tables 5, the addition of 9 Elements Citric PowerTab formulations into the wash enables increased Stain Removal across a multitude of stains, namely those that are moved by chelation like Tea and Coffee. As such, wash processes that cannot efficiently remove these types of low-pH responsive stains due to the detergent formulation pH range employed, can now have such efficacy by addition of the 9 Elements PowerTab formula.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process of reducing malodors on fabrics, comprising the steps of:

a. combining fabrics with a wash liquor, wherein the fabrics comprise at least one source of malodor and wherein the wash liquor comprises a detergent composition and a concentrated acid delivery source in the form of a fibrous water-soluble unit dose, wherein the water soluble unit dose comprises from about 60% to about 80% by weight of the water soluble unit dose of citric acid coated with a citrate;

b. washing the fabrics in the wash liquor using an automatic wash operation, a manual wash operation, or a mixture thereof; and c. separating the fabrics and the wash liquor from one another, wherein the detergent composition and the concentrated acid delivery source are separate compositions.

2. The process according to claim 1, wherein the fabrics are washed in the wash liquor at a temperature of between 10° C. and 60° C.; and wherein the wash operation takes between 5 minutes and 60 minutes.

3. The process according to claim 1, wherein the detergent composition comprises an ingredient comprising cationic polymers, polyester terephthalates, amphiphilic graft copolymers, carboxymethylcellulose, enzymes, perfumes, encapsulated perfumes, bleach, or a mixture thereof.

4. The process according to claim 1, wherein the detergent composition is a liquid and has a pH between 6 and 10, wherein the pH of the liquid detergent composition is measured as a neat pH.

5. The process according to claim 1, wherein the detergent composition is a liquid and has a pH between 7 and 8, wherein the pH of the liquid detergent composition is measured as neat pH.

6. The process according to claim 1, wherein the detergent composition is a liquid and has a pH between 2 and 6, wherein the pH of the liquid detergent composition is measured as a neat pH.

7. The process according to claim 1, wherein the water-soluble unit dose comprises a bittering agent on an outer surface.

8. The process according to claim 1, wherein the water-soluble unit dose comprises a soluble fibrous structure.

9. The process according to claim 8, wherein the acid is commingled with the soluble fibrous structure to form a coform structure.

10. The process according to claim 8, wherein the soluble fibrous structure comprises fibrous elements having a surfactant therein.

11. The process according to claim 8, wherein the fibrous structure comprises fibrous elements comprising starch.

12. A process of reducing malodors on fabrics, comprising the steps of:

a. combining fabrics with a wash liquor, wherein the fabrics comprise at least one source of malodor and wherein the wash liquor comprises a detergent composition having a pH of less than 4 when measured as a neat pH, and a concentrated acid delivery source in the form of a fibrous water-soluble unit dose, wherein the water soluble unit dose comprises from about 60% to about 80% by weight of the water soluble unit dose of citric acid coated with a citrate;

b. washing the fabrics in the wash liquor using an automatic wash operation, a manual wash operation or a mixture thereof; and c. separating the fabrics and the wash liquor from one another, wherein the detergent composition and the concentrated acid delivery source are separate compositions.

13. The process according to claim 1, wherein the acid is in the form of particles.

* * * * *